(12) United States Patent
Koivisto et al.

(10) Patent No.: US 10,501,285 B2
(45) Date of Patent: Dec. 10, 2019

(54) APPLICATION PROGRAMMING INTERFACE MANAGER

(71) Applicant: KONE Corporation, Helsinki (FI)

(72) Inventors: Ari Koivisto, Helsinki (FI); Jere Vuorenala, Helsinki (FI); Niko Elomaa, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/926,562

(22) Filed: Mar. 20, 2018

(65) Prior Publication Data

US 2018/0208430 A1 Jul. 26, 2018

Related U.S. Application Data

(63) Continuation of application No. PCT/FI2015/050629, filed on Sep. 21, 2015.

(51) Int. Cl.
*G06F 9/54* (2006.01)
*B66B 1/34* (2006.01)
(Continued)

(52) U.S. Cl.
CPC .......... *B66B 1/3461* (2013.01); *B66B 1/3453* (2013.01); *B66B 1/46* (2013.01);
(Continued)

(58) Field of Classification Search
None
See application file for complete search history.

(56) References Cited

U.S. PATENT DOCUMENTS 8,046,778 B1 10/2011 Getlin et al.
2002/0103927 A1* 8/2002 Parent ................... H04L 29/06
709/238
(Continued)

FOREIGN PATENT DOCUMENTS

DE 10 2014 203 586 A1 8/2015
EP 2 848 569 A1 3/2015
(Continued)

OTHER PUBLICATIONS

International Preliminary Report on Patentability for PCT/FI2015/050629 (PCT/IPEA/409) completed on Jan. 9, 2018.
(Continued)

*Primary Examiner* — Craig C Dorais
(74) *Attorney, Agent, or Firm* — Birch, Stewart, Kolasch & Birch, LLP

(57) ABSTRACT

Modern elevators are computer controlled and a computer program sending service requests to an elevator system may be implemented in a mobile device. An API-manager is used in a mobile device for providing a common programming interface for all elevator related applications in the mobile device. The API-manager has a certificate that is used for identifying the person using the mobile device. Thus, it is possible to execute service requests that require authorization or access rights. When the identification is provided at the API-manager third party applications executed in the mobile device do not need own certificates. Furthermore, as the API-manager has a certificate service requests can be trusted also when the mobile application is provided by a third party.

20 Claims, 2 Drawing Sheets

(51) Int. Cl.
*B66B 1/46* (2006.01)
*G06F 21/44* (2013.01)
*H04M 1/725* (2006.01)
*G06F 21/30* (2013.01)
*H04L 29/08* (2006.01)
*H04L 29/06* (2006.01)
*H04W 4/80* (2018.01)
*H04W 12/06* (2009.01)
*H04W 12/00* (2009.01)

(52) U.S. Cl.
CPC ............ *B66B 1/468* (2013.01); *G06F 21/305* (2013.01); *G06F 21/44* (2013.01); *H04L 63/0823* (2013.01); *H04L 67/125* (2013.01); *H04M 1/72533* (2013.01); *H04W 4/80* (2018.02); *H04W 12/00503* (2019.01); *H04W 12/0609* (2019.01); *B66B 2201/4653* (2013.01); *B66B 2201/4676* (2013.01); *G06F 9/54* (2013.01)

(56) References Cited

U.S. PATENT DOCUMENTS

| | | |
|---|---|---|
| 2012/0214444 A1 | 8/2012 | McBride et al. |
| 2013/0086210 A1 | 4/2013 | Yiu et al. |
| 2014/0305747 A1* | 10/2014 | Kumar ............... B66B 1/468 187/381 |
| 2014/0337528 A1 | 11/2014 | Barton et al. |
| 2017/0048383 A1 | 2/2017 | Deveaud et al. |

FOREIGN PATENT DOCUMENTS

| | | |
|---|---|---|
| WO | WO 03/009561 A2 | 1/2003 |
| WO | WO 2006/000618 A2 | 1/2006 |
| WO | WO 2007/093665 A1 | 8/2007 |
| WO | WO 2010/069347 A1 | 6/2010 |

OTHER PUBLICATIONS

International Search Report for PCT/FI2015/050629 (PCT/ISA/210) dated Jan. 21, 2016.

V et al., "Mobile Single Sign-On Solution for Enterprise Cloud Applications", Proceedings of the 2014 First International Conference on Networks & Soft Computing, Guntur, India, Institute of Electrical and Electronics Engineers, Aug. 19-20, 2014, pp. 273-277.

Written Opinion of the International Searching Authority for PCT/FI2015/050629 (PCT/ISA/237) dated Jan. 21, 2016.

European Search Report dated Apr. 18, 2019 for corresponding European Application No. 15904683.8.

* cited by examiner

APPLICATION PROGRAMMING INTERFACE MANAGER

CROSS REFERENCE TO RELATED APPLICATIONS

This application is a Continuation of PCT International Application No. PCT/FI2015/050629, filed on Sep. 21, 2015, which is hereby expressly incorporated by reference into the present application.

BACKGROUND

Mobile programmable devices are common nowadays. Examples of such devices are smart phones, tablet computers and similar. It is normal that one person owns and uses more than one device. These devices are capable of executing computer programs particularly designed for these devices. These computer programs can be downloaded, for example, from an application store or installed, for example, from a computer connected to the mobile device. Some applications are capable of communicating with other devices, for example external computing devices that are controlling further devices. For example, a mobile device may have an application for instructing a vending machine. In practice, a mobile device can be used controlling all kinds of devices that are capable of receiving instructions from the mobile device. Instructions may be received over a network connection or directly from a mobile device over a short distance networking. Such applications are very well known.

Modern elevators include one or more computing systems. Some of the computing systems are operating the elevator but the elevator may also include systems that are used for other, for example recreational or informative, purposes. For example, it is possible to provide information screen in the elevator car so that passengers can control the content on the screen by using their mobile devices as controllers. The access to control these systems can be easily provided as the passenger security is not involved in case of recreational applications.

As mentioned above, modern elevators are controlled by computing systems. For example a destination control system is a system that receives calls from calling devices, processes received calls and allocates elevators to passengers who have placed the calls. Such systems, however, typically include functionality that have issues with regard the elevator and the building safety. For example, it is typical that an elevator control system is attached to an access control system. The access control system is controlling access rights in a building, for example, to which floors a person may place a call and which doors he is able to open. In other words, elevators include a plurality of different features that require verifying if the person giving the instructions has rights to do so.

SUMMARY

Modern elevators are computer controlled and a computer program sending service requests to an elevator system may be implemented in a mobile device. An API-manager is used in a mobile device for providing a common programming interface for all elevator related applications in the mobile device. The API-manager has a certificate that is used for identifying the person using the mobile device. Thus, it is possible to execute service requests that require authorization or access rights. When the identification is provided at the API-manager third party applications executed in the mobile device do not need own certificates. Furthermore, as the API-manager has a certificate service re-quests can be trusted also when the mobile application is provided by a third party.

In an embodiment a method for controlling an arrangement comprising elevators by a mobile device is disclosed. The method comprises receiving a request for a service call, transmitting the received request using the API-manager to an API-manager in the mobile device through an application programming interface, transmitting an authentication request to an external system from the mobile device, authenticating the mobile device by using a certificate issued by a certificate authority; and as a response to a successful authentication, transmitting the request for a service call to the external system.

In a further embodiment the method further comprises transmitting the request from the external system to a second external system. In an embodiment the second external system is a system for controlling at least one elevator. In another embodiment the service call is an elevator call. In another embodiment the API-manager is configured to receive service calls from a plurality of mobile applications. In a further embodiment the method further comprises checking the validity of the service call and as a response to an approved validity check transmitting the request to the external system.

In another embodiment the method described above is implemented as a computer program. In a further embodiment the method is performed by an apparatus comprising a processor, at least one memory, wherein the memory comprises an API-manager and a wireless network connection.

In another embodiment the above described method, computer program and apparatus are implemented in an environment comprising elevators, controllers for elevators and external systems for processing the requests.

The benefits of the API-manager disclosed above include simple and trustworthy identification of a person using the mobile application. Thus, it is possible to allow third parties to provide mobile application that include controlling elevator systems and similar. Furthermore, the elevator operator receiving service requests receives only requests that have been verified and for which the access rights might have been checked. Thus, the controllers receiving the service request do not receive unnecessary request and are not vulnerable to malicious service requests. Furthermore, the API-manager provides a simple way for programmers to control elevators as they do not need to worry about access rights. Furthermore, problems caused by unintentional software failures are reduced because service requests may be verified at the API-manager. Thus, a benefit of the API-manager as disclosed above is a simplified possibility to produce third party applications for mobile devices, which leads into enhanced user experience in elevators.

BRIEF DESCRIPTION OF THE DRAWINGS

The accompanying drawings, which are included to provide a further understanding of the API-manager and constitute a part of this specification, illustrate embodiments of the API-manager and together with the description help to explain the principles of the API-manager. In the drawings.

DETAILED DESCRIPTION

Reference will now be made in detail to the embodiments, examples of which are illustrated in the accompanying drawings.

Figure 1:
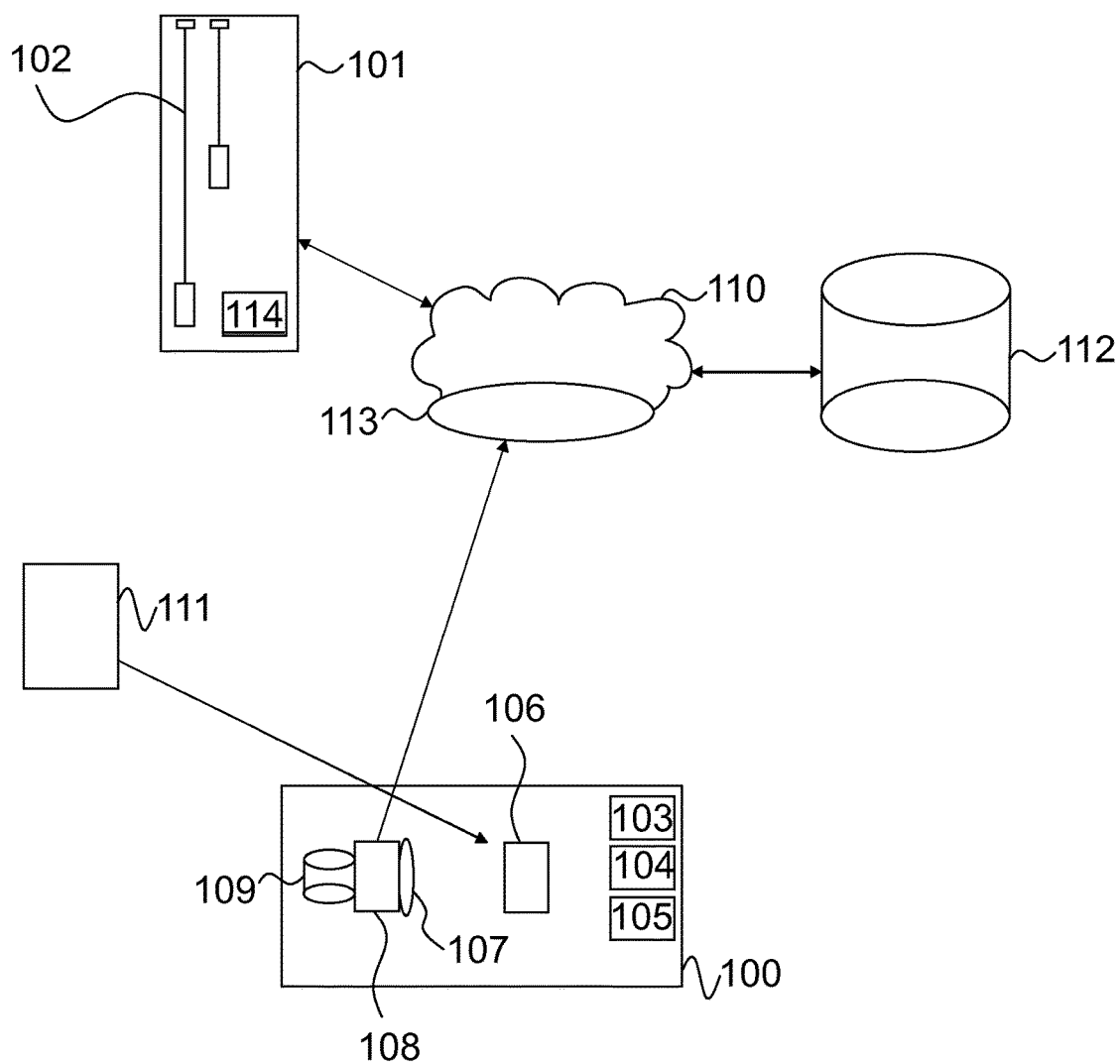
FIG. 1 is a block diagram of an example embodiment involving an API-manager.

In FIG. 1 a block diagram of a system using an API-manager is disclosed. In the figure a mobile device 100, for example a mobile phone, a tablet computer or a similar, is illustrated. The mobile device comprises at least one processor 103, at least one memory 104 and at least one network connection 105. The mobile device is capable of executing mobile application 106. The mobile application 106 is a third party application, which in this case means that it is an application that is not provided by the elevator manufacturer or building security system provider. The third party application may be provided by anyone who is capable of producing mobile applications. The mobile application 106 may be downloaded to the mobile device 100 from an application store 111 or any other application download service or other mechanism for providing mobile applications to the mobile device 100.

In the embodiment of FIG. 1 the mobile device 100 is configured to send commands to an elevator system 102 located in a building 101. For example, the person arriving at the building may wish to send an elevator call in advance. The mobile application 106 may be configured in a manner that when the person arrives at the building or vicinity of the building, the mobile application 106 approximates the distance to the elevator and the estimated time of arrival at the elevator and sends to the elevator system 102. In the figure the elevator system comprises two different elevators and respective controllers, such as a destination control system 114, which is further connected to servers, cloud or similar computing system 110.

It is commonly known that external systems are programmed through an application programming interfaces (API). In the embodiment of FIG. 1 the API 107 is arranged into the mobile device 100 together with an API manager 108 and respective certificate 109. The purpose of this arrangement is to provide a programmable interface for the mobile application 106 so that the mobile application 106 may send a command or a request to the elevator system, such as the elevator system 102. In the embodiment of figure a cloud 110 is disclosed, however, instead of a cloud any suitable server system with storage may be used. The cloud 110 is used for determining the allowability of requests received from a mobile device 100. The allowability may depend on a plurality of issues, for example, if the placed request is a correct or if a person placing the request is authorized to do so.

When the mobile device 100 executes the mobile application 106, it will access resources through the API 107. Thus, the commands and request must be in accordance with the API 107. The API-manager 108 then retrieves a corresponding certificate 109. There may be more than one certificate, however, in the first phase a certificate 109 is used for identifying the user of the mobile device 100. The API-manager 108 establishes communication with the cloud 110. The identity of the mobile device and the user of the mobile device are confirmed with the certificate 109. In the embodiment of FIG. 1 the certificate 109 has been issued by the certificate authority 112 that is maintained by a trusted entity, which is typically the manufacturer of the elevator system 102. Thus, the same application and certificates may be used for a plurality of buildings.

The certificate authority 112 issues certificates when the user of the mobile device 100, for example, installs the mobile application 106. The person installing the mobile application 106 must be identified as the application may use systems that require identification. This may be done in person or by using electronic identification means, such as network banking keys. For example, elevators are often arranged with an access control system so that person placing a call must have access to the called floor. Conventionally this has been provided by using an electronic key that is shown to a reading device at the elevator or calling device.

In the embodiment of FIG. 1 the mobile device 100 sends a request to the cloud 110 through an API provided at the cloud 113. The request is then processed at the cloud 110. The cloud 110 may include all necessary data, including the access data. When the cloud 110 includes all the data, the allowability of the call can be verified already in the cloud 110. Thus, when the cloud transmits the request to the building 102, it has been already verified as a correct and the control system does not need to deal with incorrect and unauthorized calls. However, it is possible that the cloud 110 does not have, for example, the access information. Thus, the cloud 110 only verifies the validity of the call and the control system 114 checks the access information. The user, however, may be identified by using the certificate at the API-manager. For example, this might the case in case of a need for high security where the information is not given to outside.

Certificates mentioned above, as discussed, may be used for determining the identity of the person by means of API-manager 108. Thus, mobile applications as such do not need their own certificates but a plurality of mobile applications may use the same API-manager certificate when communicating with elevators and elevator systems.

Figure 2:
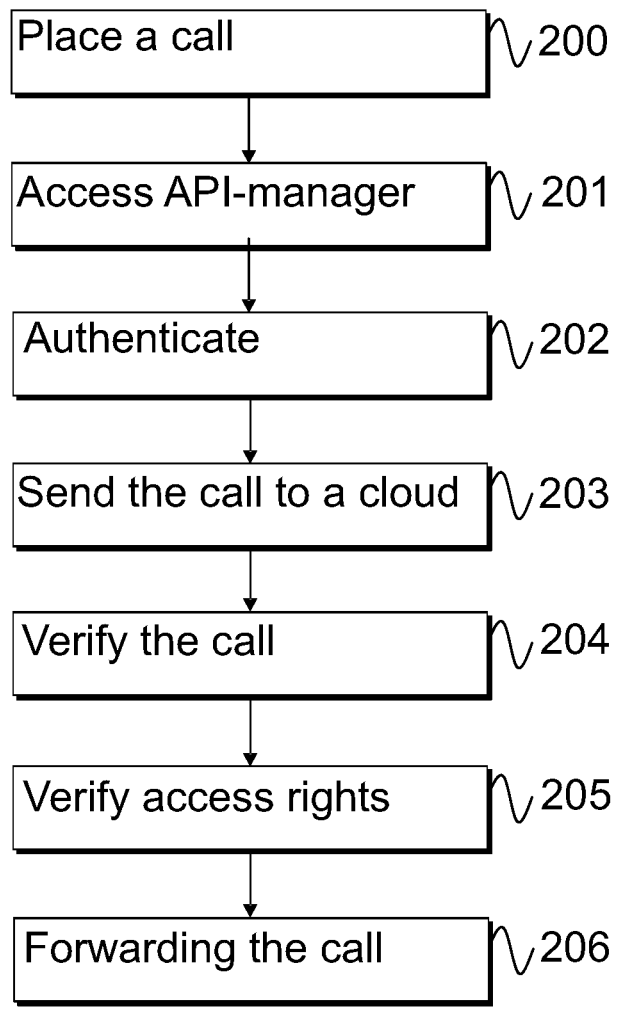
FIG. 2 is a flow diagram of a method involving an API-manager

In FIG. 2 a method using an API-manager is disclosed. In the method a mobile application for instructing elevator is installed to a mobile device. The mobile application is equipped with a certificate that is used for identifying the user of the mobile device. Firstly, the application is started. The application may implement a plurality of elevator related features, however, in the example of a FIG. 2 an elevator call is placed, step 200. The application access the API-manager through the API, step 201. The API-manager is an element comprising API-functionality, a certificate for identifying the person and the program code configured to communicate with external systems. In the embodiment of FIG. 2 the elevator call will be sent to a cloud provided by the elevator manufacturer. Before sending the elevator call the device having the API-manager is authenticated by using the certificate, step 202. When the authentication is done the elevator call is sent to the cloud, step 203. In the cloud the elevator call is verified, step 204. For example, the mobile application may purposively place false calls for various reasons. These calls can be removed before they are forwarded to the elevator systems. For example, if the called floor does not exist, the call can be removed. If the cloud has also the access information or is able to gain the access information, the access to place the call can be verified, step 205. Lastly, the cloud transmits the call to the destination elevator system, step 206. The elevator system may process the placed call further, or it may execute the call directly after receiving the call. In some embodiments it is possible to provide feedback to the mobile device. For example, if the call has been placed for an elevator ride, the elevator system may return an estimated time of arrival.

The above mentioned method may be implemented as computer software which is executed in a mobile device. When the software is executed in a mobile device it is configured to perform the above described method. The software is embodied on a computer readable medium so that it can be provided to the computing device, such as the mobile device 100 of FIG. 1.

As stated above, the components of the exemplary embodiments can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the API-manager may be implemented in various ways. The API-manager and its embodiments are thus not limited to the examples described above; instead they may vary within the scope of the claims.

The invention claimed is:

1. A method for controlling an elevator system by a mobile device, the method comprising the steps of:
    receiving a request for an elevator service call;
    transmitting said received request to an API-manager configured to transmit elevator service calls to at least one elevator of the elevator system in said mobile device through an application programming interface;
    transmitting an authentication request using said API-manager to the elevator system from said mobile device;
    authenticating said mobile device by using a certificate issued by a certificate authority; and
    in response to a successful authentication, checking validity of said elevator service call, and in response to an approved validity check, transmitting said request to said elevator system.

2. The method according to claim 1, wherein the method further comprises transmitting said request from said elevator system to a second external system.

3. The method according to claim 2, wherein said second external system is a system for controlling at least one elevator.

4. The method according to claim 1, wherein said API-manager is configured to receive elevator service calls from a plurality of mobile applications.

5. The method according to claim 1, wherein said certificate is stored at said mobile device.

6. A computer program embodied on a non-transitory computer readable medium and comprising code adapted to perform the method according to claim 1, when executed on a data-processing system.

7. An apparatus comprising:
    at least one processor;
    at least one memory, wherein the at least one memory comprises an API-manager; and
    a wireless network connection,
    wherein the apparatus is configured to:
        receive a request for an elevator service call;
        transmit said received request to the API-manager in said apparatus through an application programming interface;
        transmit an authentication request to an elevator system from said apparatus;
        authenticate said apparatus by using a certificate issued by a certificate authority; and
        as a response to a successful authentication, check validity of said elevator service call, and as a response to an approved validity check, to transmit said request to said elevator system.

8. The apparatus according to claim 7, wherein the apparatus is further configured to transmit said request from said elevator system to a second external system.

9. The apparatus according to claim 7, wherein said second external system is a system for controlling at least one elevator.

10. The apparatus according to claim 8, wherein said API-manager is configured to receive service calls from a plurality of mobile applications.

11. A system comprising:
    at least one elevator coupled to a control system;
    an external system; and
    an apparatus comprising:
    at least one processor;
    at least one memory, wherein the at least one memory comprises an API-manager; and
    a wireless network connection,
    wherein the apparatus is configured to:
        receive a request for an elevator service call;
        transmit said received request to the API-manager in said apparatus through an application programming interface;
        transmit an authentication request to the system from said apparatus;
        authenticate said apparatus by using a certificate issued by a certificate authority; and
        as a response to a successful authentication, check validity of said elevator service call, and as a response to an approved validity check, to transmit said request to the system,
    wherein said apparatus is further configured to transmit service requests to said external system and said external system is configured to process said service requests and transmit processed service requests to said control system.

12. The method according to claim 2, wherein said API-manager is configured to receive elevator service calls from a plurality of mobile applications.

13. The method according to claim 3, wherein said API-manager is configured to receive elevator service calls from a plurality of mobile applications.

14. The method according to claim 2, wherein said certificate is stored at said mobile device.

15. The method according to claim 3, wherein said certificate is stored at said mobile device.

16. The method according to claim 4, wherein said certificate is stored at said mobile device.

17. A computer program embodied on a non-transitory computer readable medium and comprising code adapted to perform the method according to claim 4, when executed on a data-processing system.

18. A computer program embodied on a non-transitory computer readable medium and comprising code adapted to perform the method according to claim 5, when executed on a data-processing system.

19. The apparatus according to claim 8, wherein said second external system is a system for controlling at least one elevator.

20. The apparatus according to claim 9, wherein said API-manager is configured to receive service calls from a plurality of mobile applications.

\* \* \* \* \*